No. 857,070. PATENTED JUNE 18, 1907.
W. JASPER.
SEWING MACHINE.
APPLICATION FILED AUG. 8, 1905.

5 SHEETS—SHEET 1.

WITNESSES:

INVENTOR
William Jasper
BY Munn & Co
ATTORNEYS

No. 857,070. PATENTED JUNE 18, 1907.
W. JASPER.
SEWING MACHINE.
APPLICATION FILED AUG. 8, 1905.

5 SHEETS—SHEET 2.

WITNESSES:
INVENTOR
William Jasper
BY
ATTORNEYS

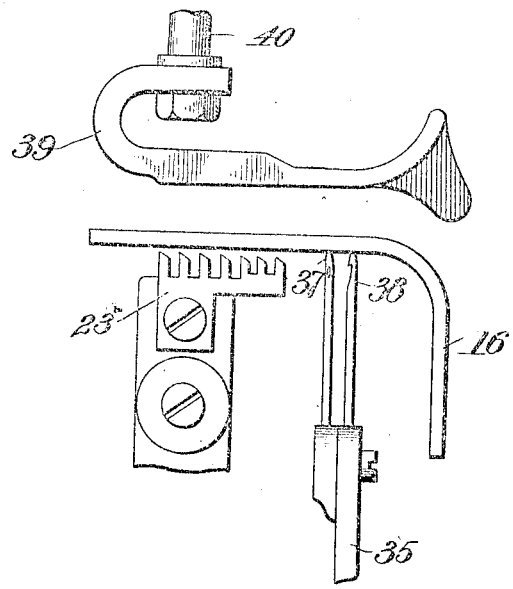

No. 857,070. PATENTED JUNE 18, 1907.
W. JASPER.
SEWING MACHINE.
APPLICATION FILED AUG. 8, 1905.

5 SHEETS—SHEET 4.

WITNESSES:
Geo. W. Naylor.
Isaac B. Owens.

INVENTOR
William Jasper
BY Munn & Co.
ATTORNEYS

No. 857,070.  
PATENTED JUNE 18, 1907.  
W. JASPER.  
SEWING MACHINE.  
APPLICATION FILED AUG. 8, 1905.  
5 SHEETS—SHEET 5.
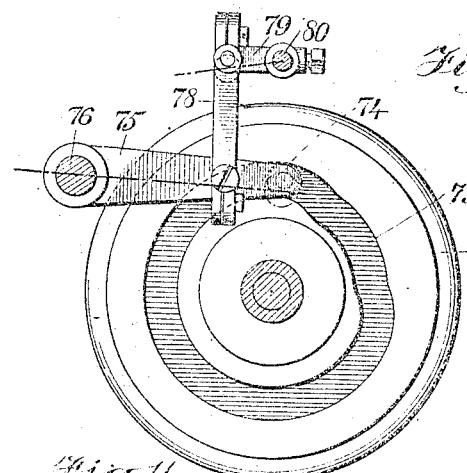
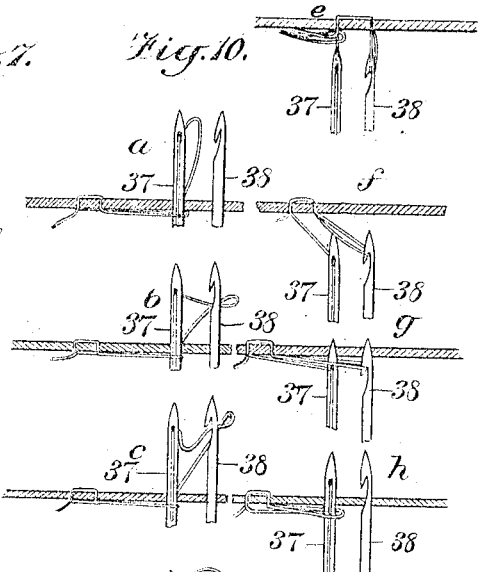
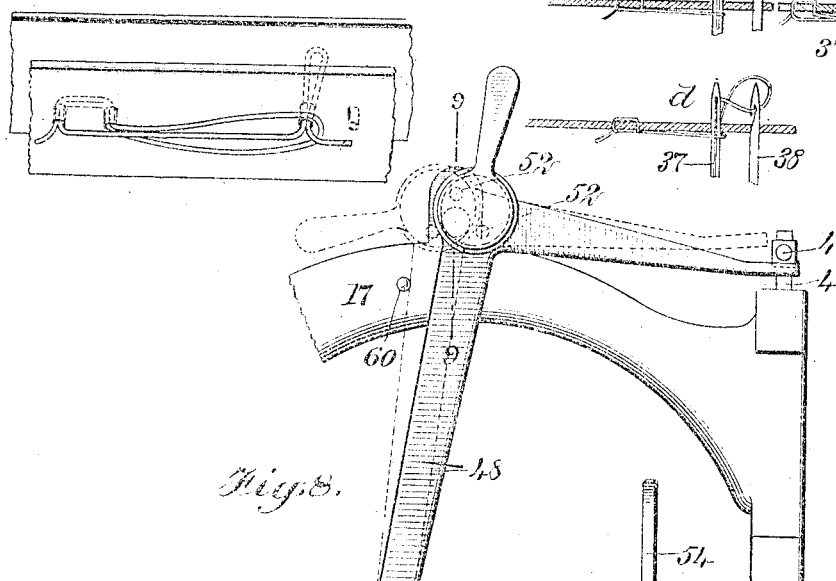
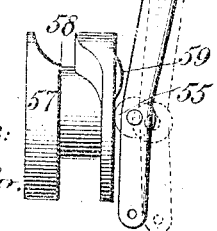
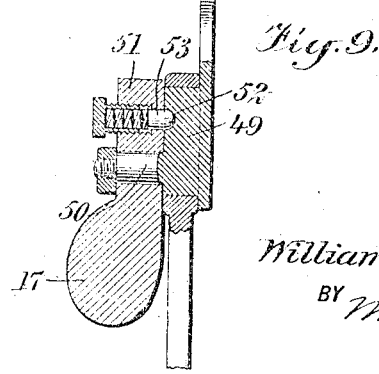
WITNESSES:  
Geo. W. Naylor.  
Isaac B. Owens.
INVENTOR  
William Jasper  
BY Munn & C.  
ATTORNEYS

UNITED STATES PATENT OFFICE.

WILLIAM JASPER, OF NEW YORK, N. Y., ASSIGNOR OF ONE-HALF TO ANDREW WOLF, OF NEW YORK, N. Y.

SEWING-MACHINE.

No. 857,070.  Specification of Letters Patent.  Patented June 18, 1907.

Application filed August 3, 1905. Serial No. 272,224.

*To all whom it may concern:*

Be it known that I, WILLIAM JASPER, a citizen of the United States, and a resident of the city of New York, borough of Manhattan, in the county and State of New York, have invented a new and Improved Sewing-Machine, of which the following is a full, clear, and exact description.

The invention relates to a machine especially useful for sewing straw braid used in making hats, although it may be applied to other purposes, as will fully appear hereinafter.

The invention is of that type in which a needle and hook are arranged below the stitch plate and adapted to move up through the same and through the work, at which time they coact with loopers which carry a loop of thread from the needle over to the hook, so that upon the descent of the needle and hook the hook carries its loop down to the under side of the work in position for the needle to pass through it upon the next ascent of the same, thus forming a chain stitch which is almost completely concealed on one side of the work.

The invention resides in various novel features of construction and organization of elements, all of which will be fully set forth hereinafter and pointed out in the claims.

Figure 1:
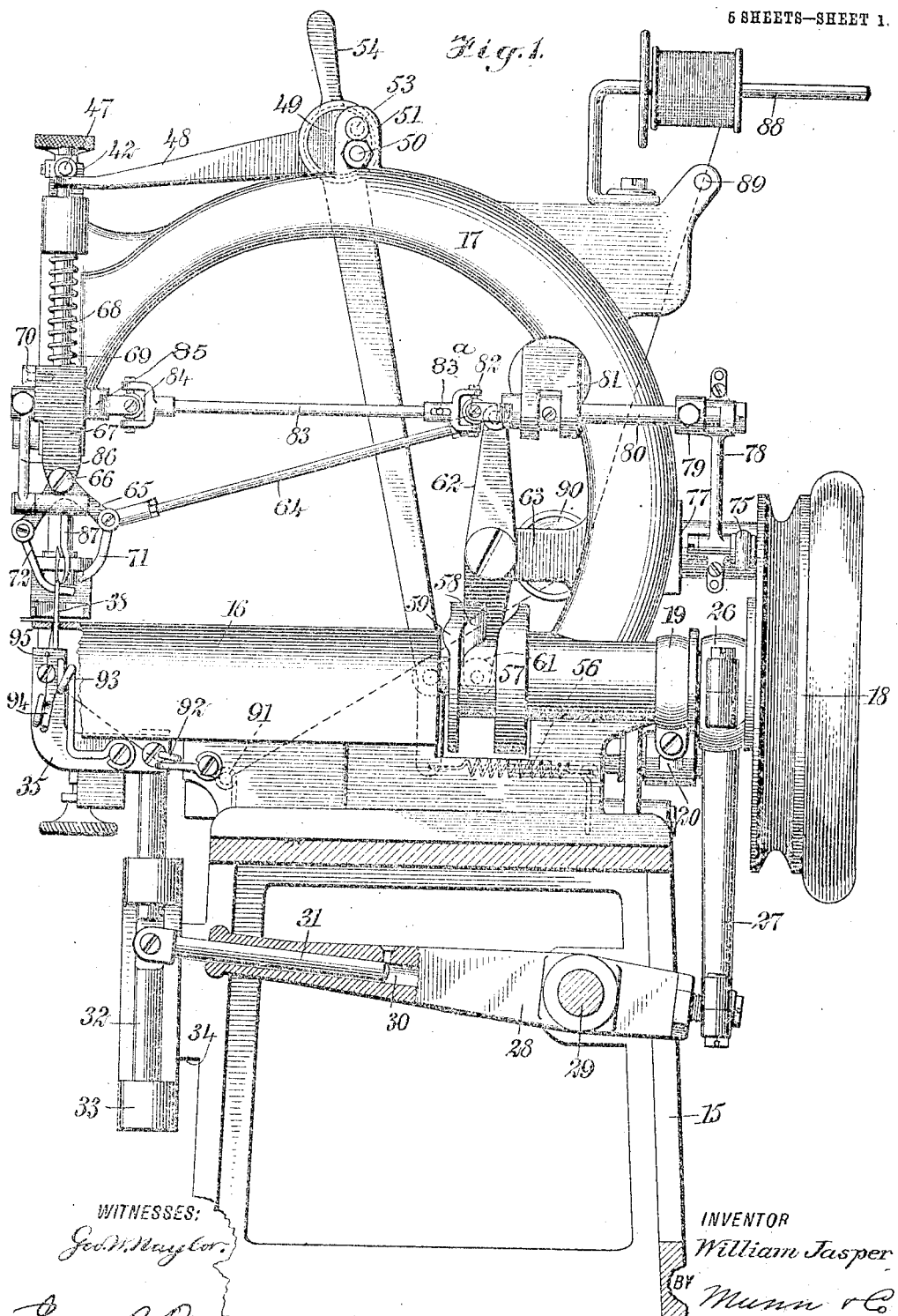
Figure 2:
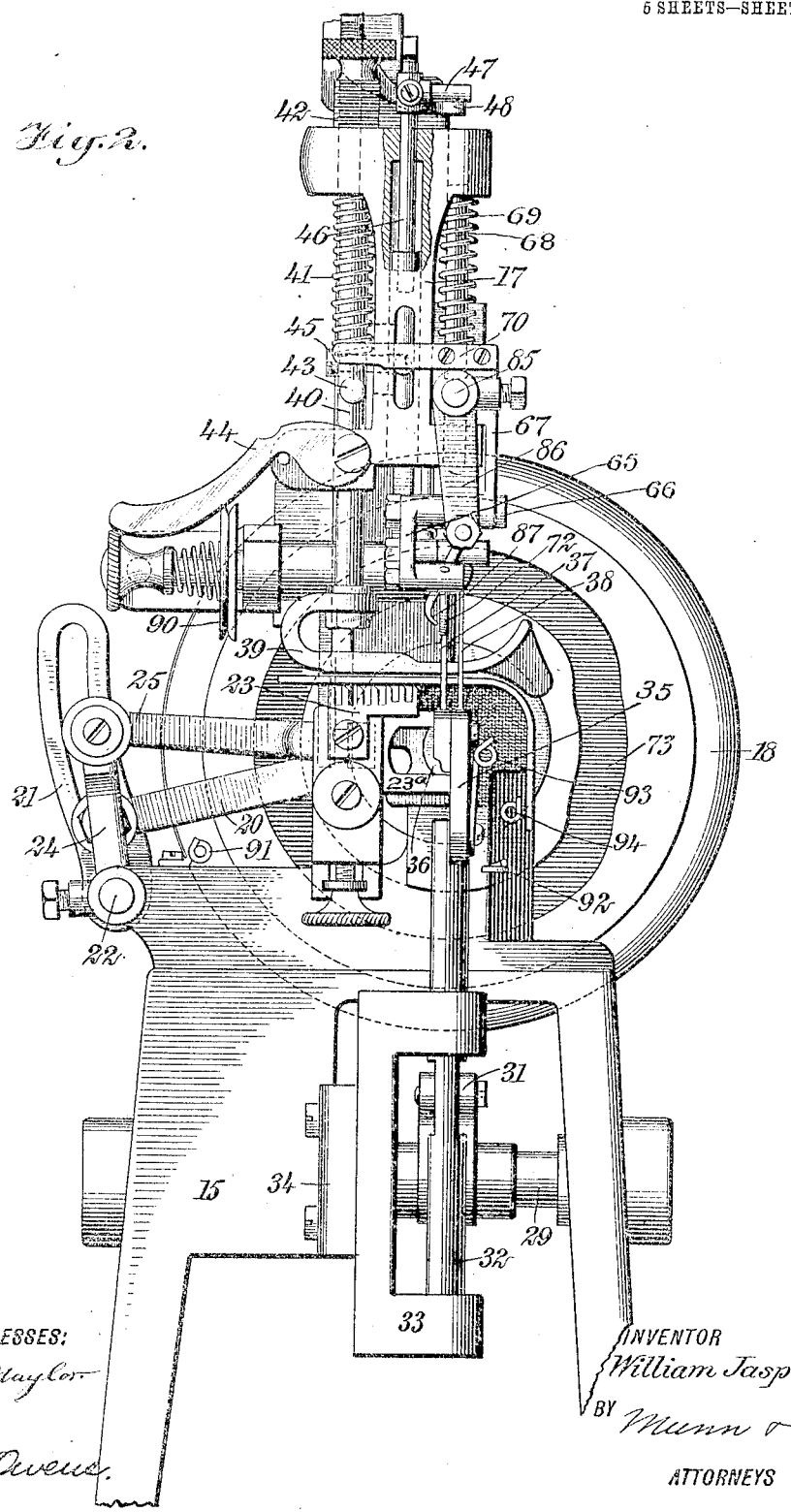
Figure 3:
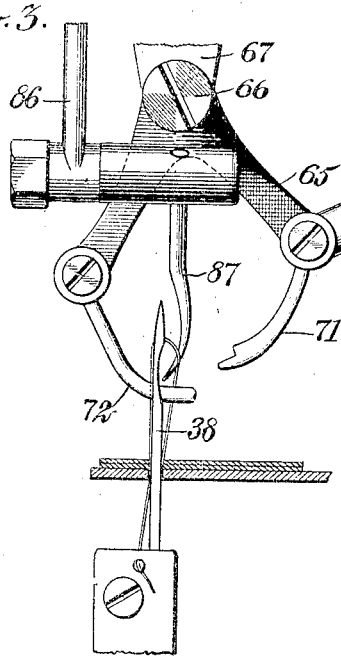
Figure 5:
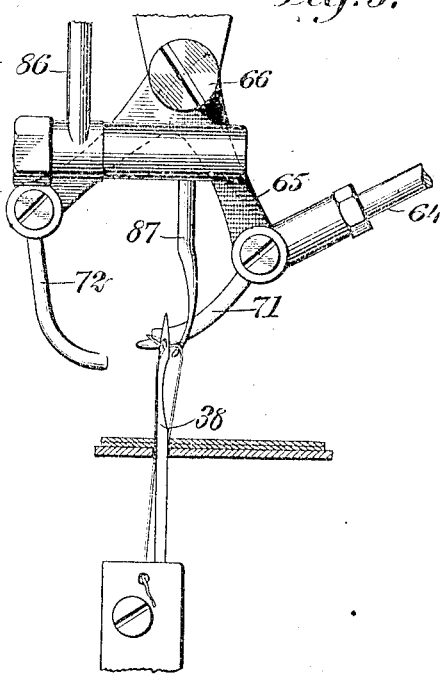
Figure 4:
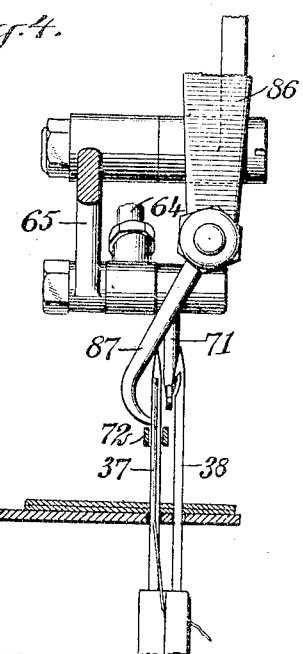
Figure 6:
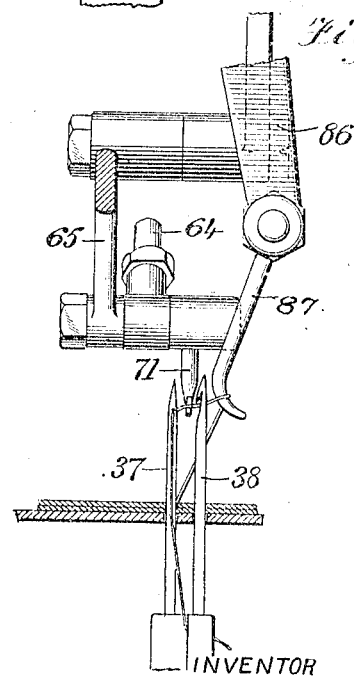

Reference is had to the accompanying drawings which illustrate as an example the preferred embodiment of my invention, in which drawings Figure 1 is a front side elevation of the sewing machine with a part of the base broken away to show the lever for operating the needle bar; Fig. 2 is an end elevation with a part of the frame or upper arm broken away to show the device for mechanically lifting the presser foot; Fig. 2$^a$ is a detail view showing the presser foot in the act of being mechanically lifted at the time the feed dog begins its descent; Fig. 3 is an enlarged front side elevation showing the loopers, the guide and hook in the first part of the act of carrying the loop over to the hook; Fig. 4 is an end elevation of the parts shown in Fig. 3, and showing said parts in the same position as in Fig. 3; Fig. 5 is an enlarged front side elevation of the loopers, the guide and hook, showing said elements in the second part of the act of taking the loop over to the hook; Fig. 6 is a front end elevation of the same parts shown in Fig. 5, and showing said parts in the same position; Fig. 7 is a view showing the cam race on the inner side of the band wheel of the machine, and illustrating the linkage for driving one of the loopers; Fig. 8 is a fragmentary view showing the device by means of which the presser foot may be mechanically raised and lowered; Fig. 9 is a detail section on the line 9—9 of Fig. 8; Fig. 10 is a group of views illustrating the formation of the stitch; and Fig. 11 is a view showing the stitch.

As illustrated best in Figs. 1 and 2, the machine in the form here illustrated has a base or stand 15 supporting the framing of the machine which constitutes the lower arm or stitch plate 16, and the upper arm 17. Mounted in the lower arm 16 is the usual rotating main shaft or prime mover which carries a band wheel 18, by which motion is imparted to it.

The prime mover shaft carries the usual eccentric encircled by a strap 19 for operating through the medium of a link 20 and slotted arm 21 the rock shaft 22 for driving the feed dog 23. The shaft 20 extends along the rear side of the machine at the base thereof, and is in connection with the dog 23 through an arm 24 and link 25. Said dog is arranged to operate in an opening in the lower arm or stitch plate 16. The linkage above described oscillates the dog, and the same is given its characteristic vertical movement by an eccentric 36 fastened to the end of the prime mover shaft of the machine and engaging a yoke 23$^a$ attached to the feed dog, all of which is common in the prior art. The prime mover shaft has a second eccentric directly adjacent to the band wheel 18. This eccentric is encircled by a strap 26 from which a connecting rod 27 depends. Said rod is articulated to one end of a lever 28 fulcrumed on a stud shaft 29 held by a bracket projecting from the base 15 of the machine. The lever 28 extends to the left hand end of the machine, and has a longitudinal opening 30 formed therein loosely receiving the rod 31 which is pivoted to the needle bar 32 of the machine. This bar is arranged below the lower arm 16, and is held to reciprocate in a guide 33 sustained by a bracket 34 projecting from the base. The upper end of the needle bar 32 carries a bracket 35 which extends outward and thence upward to a point directly under the lower arm or stitch plate in front of the feed dog. This bracket 35 has fixed thereto the needle 37 and a hook 38, these parts extending vertically in position to move back and forth through the stitch plate and lying in line with each other with the hook in front of the needle, as illustrated in Figs. 3 to 6 and Fig. 10.

The presser foot 39 bears on the stitch plate over the feed dog and needle and is orificed in the usual manner, and is carried by a presser bar 40 which is arranged to reciprocate vertically in the end of the upper arm 17 of the sewing machine frame. Said bar and the presser foot are pressed down yieldingly into position by a spring 41, the tension of which may be regulated by a tubular screw 42. The bar 40 is provided with a stud 43 adapted to be engaged by the usual lifter cam 44 pivoted on the arm 17. The bar 40 is also provided with a screw 45 passing horizontally through a vertical slot in the arm 17 and connecting the bar 40 with a bar 46 sliding in a vertical opening formed in the arm 17 see the full and dotted lines in Fig. 2. The bar 46, as here shown, is formed in two rigidly joined sections. This is, however, in no way essential. Said bar 46 projects through the top of the arm 17 and has a laterally disposed forwardly projecting stud 47 attached to its upper end. This stud is adapted to be engaged on its under side by the upper arm of an elbow lever 48, which lever is fulcrumed at its elbow on an eccentric 49. This eccentric as shown best in Figs. 8 and 9 has a pivot 50 mounted in the bracket 51 projecting from the arm 17. The eccentric is provided in the side adjacent to the bracket 51 with two cavities 52, one of which is shown by full lines in Fig. 9, and both of which are indicated by broken lines in Fig. 8. These cavities are adapted to coact with a spring pressed lock pin 53 mounted in a bracket 51 integral with the arm 17 whereby to hold the eccentric 49 in either one of two positions. Said eccentric is provided with a finger piece 54 through the medium of which the lock pin 53 may be overcome by manual pressure so as to change the position of the eccentric. The long vertical arm of the elbow lever 48 reaches down to a position alongside of the prime mover shaft of the machine, and carries a roller 55 at its lower end portion. A spring 56 is also connected to the lower arm of the elbow lever, as shown by broken lines in Fig. 1.

Attached to the main shaft or prime mover of the machine is a cam 57 which has a race 58 in its face and a cam surface 59 on one side. When the eccentric 49 is in the position shown in Fig. 1 the roller 55 of the elbow lever 48 is held by the spring 56 against the side of the cam 57 having the surface 59, so that each time said cam surface 59 strikes the roller the elbow lever is rocked, and through the medium of the parts 47, 46, 45 and 40 the presser foot is lifted. If the eccentric is held in the position shown by full lines in Fig. 9, the presser foot is lifted from the work once during each revolution of the prime mover shaft, and the parts are so timed that this lifting of the presser foot occurs when the needle, hook and feed dog are in the position below the stitch plate. This arrangement enables the work to be conveniently turned into any desired position without tearing the straw braid by the pressure of the feed dog and presser foot thereon, and without in any way interfering with the operation of the stitch forming devices, the presser foot being returned to its active position in time for the operations of the feed dog in advancing the work, and for the action of the needle and hook, as will be hereinafter fully set forth. By throwing the eccentric 52 back to its second position, as indicated by the broken lines in Fig. 8, the elbow lever 48 is withdrawn from engagement with the stud 47 and the cam 57, the second position of the elbow lever being practically that illustrated by the broken lines in Fig. 8, and in this position the elbow lever rests idly against a pin 60 which is carried by the arm 17, as shown best in Fig. 8. It will then be seen that the presser foot may be raised and lowered manually in the usual manner, and that the devices may be thrown into action whenever desired for mechanically imparting a periodic up and down movement to the presser foot in unison with the action of the stitch forming devices to facilitate the manual adjustment of the work in the machine.

The race 58 of the cam 57 receives a roller 61 carried by a lever 62 which is intermediately fulcrumed on a bracket 63 projecting from the frame of the machine. The lever 62 extends vertically and has its upper end pivoted to a link 64 which extends outward over the lower arm or stitch plate 16, and is pivoted to an oscillating elbow 65. This elbow is mounted at its bend upon a pivot 66 carried by a slide 67. The slide 67 is arranged to move vertically on a rod 68, the slide and rod lying at the front side of the end of the upper arm 17. The slide engages a plane surface on said arm to prevent turning of the slide around the rod, and the slide is pressed firmly downward into the position shown in Fig. 1 by means of a spring 69 which encircles the rod 68. Attached to the slide 67 is an arm 70 which as shown best in Fig. 2 projects horizontally across the end of the arm 17 and lies in a position over the pin or stud 43 of the bar 40 so that when said bar is lifted either by the action of the lifter cam 44 or by the action of the elbow lever 48 the slide 67 with its attachments will also be lifted. This is for the purpose of raising the loopers out of the path of the upwardly moving presser foot. The instant the presser foot is returned the spring 68 returns the slide 67 and its attachments to active position. During the vertical movement of the slide the link 64 swings through an arc, the center of which is at the upper end of the lever 62, and the elbow 65 then rocks on its pivot 66 to allow for this movement. The elbow 65 carries on one of its limbs a looper 71 and on the other of its limbs a bifurcated or forked guide 72. The elbow is arranged to rock in a plane disposed longitudinally of the main shaft of the machine, and the looper 71 and guide 72 curve toward each other and are so positioned that as they rock with the elbow the bifurcated lower end of the guide 72 straddles the needle when the same is in its raised position, and the looper 71 moves between the needle and hook after the guide has been withdrawn whereby to engage the loop with the parts of the hook, all of which will be fully set forth hereinafter.

As shown in Figs. 2 and 7, the band wheel 18 has in its inner side a cam race 73 receiving a roller 74 carried at the end of an arm 75. This arm is arranged to rock around a center 76 which is supported by a bracket 77 projecting from the frame of the machine (see Fig. 1). Said arm 75 is articulated to a link 78 (see Figs. 1 and 7) which extends upward and is itself articulated to an arm 79 fastened to a rock shaft 80. The rock shaft 80 is mounted horizontally in a bracket 81 at the front side of the machine, and has a universal connection 82 with one end of a shaft 83. The other end of the shaft 83 has a universal connection 84 with a short shaft 85 (see Fig. 2). This short shaft 85 is mounted to rock in the slide 67, and it has fixed thereto a downwardly extending arm 86, to the lower end of which the second looper 87 is adjustably connected. As shown in Fig. 1, the shaft 83 is joined to the coupling 82 by means of a pin and slot connection 83ᵃ, which allows to the shaft 83 that slight longitudinal movement made necessary by reciprocation of the slide 67 in a direction transverse to the said shaft. The second looper 87 owing to the location of the shafts 80, 83 and 85 swings in a plane transverse to that of the prime mover shaft of the machine, and is arranged to cross over and carry the loop from the needle to the hook during the downward movement of said elements immediately before the movement of the looper 71 and during the withdrawal of the guide 72 from engagement with the needle as shown in Figs. 4 and 6. The thread passes from the spool on the holder 88 through an eye 89 down to a tension device 90, and thence to a guide 91 on the back of the machine and across to a guide 92 on the front thereof. It then passes through the guide 93 attached to the bracket 35 of the needle bar and from the guide 93 to a guide 94 carried by the lower arm 16, and finally from the guide 94 through an eye 95 in the bracket 35 up to the needle.

In the operation of the machine, the parts should be assembled as in Figs. 1 and 3. Should it be desired that the presser foot bear constantly on the work the eccentric 19 should be adjusted to the position shown by broken lines in Fig. 8, but should the work be of such nature as to endanger injuring the work by turning it between the feed dog and presser foot the eccentric should be adjusted as shown by full lines in Fig. 8, thus causing the presser foot to be regularly raised at the intervals between the feeding action so that the work may be freely turned without danger of injury thereto. The work should be inserted under the presser foot in the usual manner, and the cam lever 44 operated to permit the presser foot to descend into operative position. This movement of the presser foot and its connected parts is followed by a similar movement of the slide 67 and the connected looper devices, all of which parts now assume their operating positions. Upon starting the machine, the work is intermittently fed and at intervals between the feeding actions the needle and hook rise through the work. As the needle passes through the work, the thread drawn taut is carried up in a loop, as shown in Figs. 3 and 4. As the needle takes this position the rocking elbow 65 throws the guide 72 over so that its forked end embraces the needle and loop, and immediately following this action the looper 87 moves over to the needle and from the same to and past the hook, engaging the loop and carrying it over to the hook, as shown in Figs. 3 and 6. The guide 72 embracing the needle and loop as explained holds the loop fair for engagement of the looper 87 therewith, and thus prevents the possibility of the looper missing the loop, a defect which has existed in prior machines and a defect which it is one of the objects of my invention to overcome. The guide 72 serves another important function, in that it lies under the upper part of the loop and acts as a barrier or guard against particles of the straw being sewed when said particles are thrown upward by the action of the feed dog, needle and hook and other adjacent parts of the machine, preventing such particles from disarranging the loop and interfering with the proper action of the looper 87. As said looper engages the loop and takes it over to the hook, the elbow 65 reverses its movement and in consequence thereof the guide is withdrawn while the looper 71 advances to the stitch line and crosses between the needle and hook, engaging the loop and moving it under the parts of the hook so that this element then descending with the needle takes the loop down through the work. The thread guide 93 moving downward with the needle and hook slacks up the thread to enable the work to be fed for the next stitch. The stitch itself does not differ from the stitch commonly effected by machines of the type to which my invention relates, and the various steps in the formation of the stitch are shown in succession at *a*, *b*, *c*, *d*, *e*, *f*, *g* and *h* in Fig. 10, while in Fig. 11 a fragment of the finished stitch is illustrated.

It will be seen that the machine furnishes a long, unobstructed lower arm or work support enabling wide brimmed and other peculiarly shaped hats to be readily formed. This lower arm also permits the easy application of a sewing machine gage, of the type usually employed in this class of work.

Having thus described the preferred form of my invention, what I claim as new and desire to secure by Letters Patent is:

1. A sewing machine provided with a needle mechanism, a complemental stitch forming mechanism, a presser foot a bodily movable loop guide above the presser foot and operating mechanism for positively moving the said guide toward and from the needle.

2. A sewing machine provided with a needle and hook working up through the work plate, a presser foot above the work plate, means for operating the said parts, mechanism above the presser foot for carrying the loop from the needle into operative relation with the hook, a loop-guide also located above the presser foot and engaging the needle at its side opposite the said loop carrying mechanism and means for supporting the loop guide from the head.

3. A sewing machine provided with a needle and hook working up through the work plate, a presser foot above the work plate, means for operating said parts, means for carrying the loop from the needle into operative relation with the hook, a bodily movable loop guide above the presser foot to engage the needle and hold the loop for the loop carrying mechanism, and means for positively actuating the said loop guide.

4. A sewing machine having a needle and hook, means for carrying a loop from the needle into operative relation with the hook, and a forked member adapted to straddle the needle to guide the loop and insure the engagement therewith of said means for carrying the loop.

5. A sewing machine having a needle and hook, means coacting with the upper portions thereof to carry the loop from the needle into operative relation with the hook presser foot and feed mechanism, and a means extending horizontally between the presser foot and said means for carrying the loop to protect the same and the loop from detached particles of the work.

6. A sewing machine having a needle and hook, a pivoted loop guide coacting with the needle mechanism for positively actuating the said guide toward and from the needle, a looper adapted to take the loop from the needle to the hook, and a second looper adapted to engage the loop with the hook.

7. A sewing machine having a needle and hook, a loop guide coacting with the needle, a looper adapted to take the loop from the needle to the hook, and a second looper adapted to engage the loop with the hook, the loop guide and the second looper being movable alternately toward and from the stitch line, and the first looper being movable across the path of the guide and second looper.

8. A sewing machine having a needle and hook, a loop guide coacting with the needle, a looper adapted to take the loop from the needle to the hook, a second looper adapted to engage the loop with the hook, an elbow lever on the limbs of which the guide and second looper are mounted to move alternately toward and from the stitch line, and a rocker arm on which the first looper is mounted to move across the path of the guide and second looper.

9. A sewing machine having a needle and hook, a loop guide coacting with the needle, a looper adapted to take the loop from the needle to the hook, a second looper adapted to engage the loop with the hook, an elbow lever on the limbs of which the guide and second looper are mounted to move alternately toward and from the stitch line, a rocker arm on which the first looper is mounted to move across the path of the guide and second looper, and means for mounting the elbow and rocker arm which means is movable toward and from the work.

10. A sewing machine having a needle and hook, a loop guide coacting with the needle, a looper adapted to take the loop from the needle to the hook, a second looper adapted to engage the loop with the hook, an elbow lever on the limbs of which the guide and second looper are mounted to move alternately toward and from the stitch line, a rocker arm on which the first looper is mounted to move across the path of the guide and second looper, means for mounting the elbow and rocker arm, which means is movable toward and from the work, a presser foot, and a connection between the same and the said means for mounting the elbow and rocker arm.

11. A sewing machine having a needle and hook, a loop guide, means for carrying the loop from the needle into operative relation with the hook, and a means for mounting said guide and means for carrying the loop, said mounting means being movable toward and from the work.

12. A sewing machine having a needle and hook, a loop guide, means for carrying the loop from the needle into operative relation with the hook, means for mounting said guide and means for carrying the loop, said mounting means being movable toward and from the work, a presser foot, and a connection between the presser foot and said mounting means.

13. A sewing machine having a needle and hook, looper mechanism, a slide on which the same is mounted, a spring pressing the slide toward the work, a presser foot, a spring pressing the presser foot toward the work, and a connection between the slide and presser foot to cause the former to move upward with the latter.

14. A sewing machine having a needle and hook, a looper means including a swinging part, a movable member on which said swinging part is pivoted, means for imparting movement to said swinging part irrespective of the movement of said member and a presser foot independent of said movable member.

15. A sewing machine having a needle and hook, a looper means including a swinging part, a movable member on which said swinging part is pivoted, means including a combined reciprocating and swinging rod for imparting movement to said swinging part irrespective of the movement of said member and a presser foot independent of said member.

16. A sewing machine having a needle and hook, a looper means including a swinging part, a movable member on which said swinging part is pivoted, and means including a rock shaft with a universal and extensible joint and arranged to impart movement to said swinging part irrespective of the movement of said member.

17. A sewing machine having a needle and hook, a looper means including two swinging parts, a movable member on which said swinging parts are pivoted, a rod connected to one swinging part and capable of combined swinging and reciprocal motion, a rocking shaft arranged to swing the other swinging part and having a universal and extensible joint therein, and means for reciprocating the rod and rocking the shaft.

18. A sewing machine having a needle and hook, a looper means including two swinging parts, a movable member on which said swinging parts are pivoted, a rod connected to one swinging part and capable of combined swinging and reciprocal motion, a rocking shaft arranged to swing the other swinging part and having a universal and extensible joint thereon, means for reciprocating the rod and rocking the shaft, and a loop guide connected to the first swinging part to be actuated simultaneously therewith.

19. A sewing machine comprising a needle and hook working up through the work plate, a presser foot above the work plate, a feed dog therebelow, looper mechanism above the presser foot to take the loop from the needle to the hook, means for automatically lifting the presser foot from the work as the feed dog and needle and hook are disengaged from the same.

20. A sewing machine, a feed dog, a presser foot, stitch forming devices, and means for automatically lifting the presser foot from the work as the feed dog disengages the same, said means comprising a cam, an elbow lever actuated thereby and having connection with the presser foot, and an adjustable eccentric received in a cavity in the elbow lever and forming the fulcrum thereof, whereby upon adjustment of the eccentric the elbow lever may be moved bodily to render it active or inactive.

In testimony whereof I have signed my name to this specification in the presence of two subscribing witnesses.

WILLIAM JASPER.

Witnesses:
 ISAAC B. OWENS,
 JNO. M. RITTER.